(12) United States Patent
Hintermeir

(10) Patent No.: US 9,784,174 B2
(45) Date of Patent: Oct. 10, 2017

(54) METHOD FOR OPERATING A RAIL VEHICLE

(75) Inventor: Stefan Hintermeir, Aschau I. CH (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 665 days.

(21) Appl. No.: 14/000,250

(22) PCT Filed: Feb. 8, 2012

(86) PCT No.: PCT/EP2012/052085
§ 371 (c)(1),
(2), (4) Date: Aug. 19, 2013

(87) PCT Pub. No.: WO2012/110370
PCT Pub. Date: Aug. 23, 2012

(65) Prior Publication Data
US 2013/0332047 A1 Dec. 12, 2013

(30) Foreign Application Priority Data
Feb. 17, 2011 (DE) .................. 10 2011 004 327

(51) Int. Cl.
*F01P 7/16* (2006.01)
*B61C 5/02* (2006.01)
(Continued)

(52) U.S. Cl.
CPC ............... *F01P 7/167* (2013.01); *B61C 5/02* (2013.01); *F01P 7/04* (2013.01); *F01P 2025/13* (2013.01);
(Continued)

(58) Field of Classification Search
CPC .......... F01P 2025/13; F01P 7/045; F01P 7/02; F01P 7/10; F01P 7/12; F01P 7/026;
(Continued)

(56) References Cited

U.S. PATENT DOCUMENTS 2,279,037 A * 4/1942 Endsley ................... F01P 7/08
123/41.05
2,341,789 A * 2/1944 Justus ....................... F01P 7/04
105/62.2

(Continued)

FOREIGN PATENT DOCUMENTS

DE 19953511 A1 5/2001
DE 69617090 T2 6/2002

*Primary Examiner* — Sizo Vilakazi
*Assistant Examiner* — Brian Kirby
(74) *Attorney, Agent, or Firm* — Laurence Greenberg; Werner Stemer; Ralph Locher

(57) ABSTRACT

A rail vehicle has a diesel engine, an engine radiator and a cooling circuit that connects the diesel engine to the engine radiator. A cooling liquid is circulated in the cooling circuit, a cooling liquid temperature of the circulated cooling liquid and an outer air temperature of the atmospheric outer air are detected. The outer air temperature is compared with the outer air limit temperature, the cooling power of the engine radiator is set in such a way that the cooling liquid temperature corresponds to a normal operating temperature if the outer air temperature is less than the outer air limit temperature. The cooling power of the engine radiator is set such that the cooling liquid temperature corresponds to a lower operating temperature below the normal operating temperature if the outer air temperature is greater than the outer air limit temperature.

9 Claims, 3 Drawing Sheets

Figure 1:
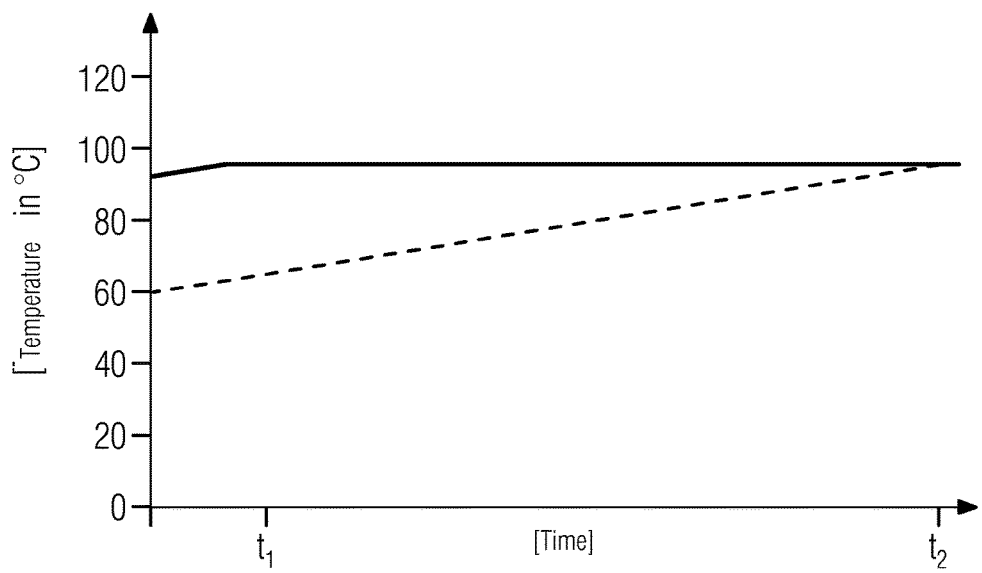

(51) Int. Cl.
  *F01P 7/04* (2006.01)
  *F02D 45/00* (2006.01)
(52) U.S. Cl.
  CPC .......... *F01P 2025/30* (2013.01); *F02D 45/00* (2013.01); *Y02T 30/10* (2013.01)
(58) Field of Classification Search
  CPC ........ F01P 7/06; F01P 7/14; F01P 7/16; F01P 7/167; F01P 2007/168; F02D 2200/021; F02D 2200/0414; F02D 2200/702; F02D 2200/701; F02D 2200/70; B61C 5/02
  USPC ........ 123/41.12, 198 D, 41.49, 41.48, 41.42, 123/41.1, 41.11, 41.44; 702/184; 105/62.2, 61; 290/3, 9; 165/291, 299, 165/300; 701/102, 19, 36; 62/133
  See application file for complete search history.

(56) References Cited

U.S. PATENT DOCUMENTS

| | | | | |
|---|---|---|---|---|
| 2,423,929 | A * | 7/1947 | Dilworth | B61O 5/02 105/35 |
| 2,756,026 | A * | 7/1956 | Myrent | G05D 23/275 165/127 |
| 3,162,182 | A * | 12/1964 | Gratzmuller | F01P 3/2207 123/41.08 |
| 3,877,455 | A * | 4/1975 | Goodwin | F01M 1/24 123/198 D |
| 4,426,960 | A * | 1/1984 | Hart | G05D 23/1912 123/41.15 |
| 4,642,770 | A * | 2/1987 | Shirley | B60H 1/3208 165/42 |
| 4,665,319 | A * | 5/1987 | Seepe | F01P 7/048 290/1 B |
| 4,698,761 | A * | 10/1987 | Cooper | G05D 23/24 123/198 D |
| 5,392,741 | A * | 2/1995 | Uzkan | F01P 11/14 123/41.13 |
| 5,415,147 | A * | 5/1995 | Nagle | F01P 3/20 123/41.29 |
| 5,425,338 | A * | 6/1995 | Gottemoller | F02D 23/00 123/357 |
| 5,440,489 | A * | 8/1995 | Newman | B61L 3/006 340/994 |
| 5,487,516 | A * | 1/1996 | Murata | B61L 27/0027 246/182 C |
| 5,529,025 | A * | 6/1996 | Ranzinger | F01P 7/167 123/41.1 |
| 5,561,602 | A * | 10/1996 | Bessler | B60L 3/00 123/41.13 |
| 5,566,745 | A * | 10/1996 | Hill | B61C 5/02 105/62.2 |
| 5,598,705 | A | 2/1997 | Uzkan | |
| 6,006,731 | A * | 12/1999 | Uzkan | F01P 7/165 123/41.29 |
| 6,098,576 | A * | 8/2000 | Nowak, Jr. | F01P 3/20 123/41.29 |
| 6,142,108 | A * | 11/2000 | Blichmann | F01P 7/026 123/41.05 |
| 6,227,153 | B1 * | 5/2001 | Till | F01P 11/14 123/41.12 |
| 6,230,668 | B1 * | 5/2001 | Marsh | F01P 7/165 123/41.44 |
| 6,286,311 | B1 * | 9/2001 | Chen | F02B 29/0437 123/41.13 |
| 6,394,044 | B1 * | 5/2002 | Bedapudi | F01P 7/04 123/196 AB |
| 6,556,906 | B1 * | 4/2003 | Hesse | B60H 1/03 123/41.02 |
| 6,591,174 | B2 * | 7/2003 | Chung | F01P 7/048 123/41.12 |
| 6,604,515 | B2 * | 8/2003 | Marsh | F01P 7/165 123/41.31 |
| 6,799,096 | B1 * | 9/2004 | Franke | B60L 15/2045 318/143 |
| 6,941,245 | B2 * | 9/2005 | Longnecker | F01P 7/167 702/184 |
| 7,072,747 | B2 * | 7/2006 | Armbruster | B61L 3/006 246/122 R |
| 7,128,026 | B2 * | 10/2006 | Braun | F02M 26/28 123/41.01 |
| 7,131,403 | B1 * | 11/2006 | Banga | F01P 7/165 123/196 AB |
| 7,219,067 | B1 * | 5/2007 | McMullen | B61L 27/0011 246/122 R |
| 7,347,168 | B2 * | 3/2008 | Reckels | F01P 7/167 123/41.11 |
| 7,533,636 | B2 * | 5/2009 | Marsh | F01M 5/002 123/196 AB |
| 7,974,774 | B2 * | 7/2011 | Kumar | B61L 3/006 123/205 |
| 7,987,822 | B2 * | 8/2011 | Fishman | F01P 7/167 123/41.1 |
| 8,504,226 | B2 * | 8/2013 | Brooks | B61L 3/006 701/19 |
| 8,522,691 | B1 * | 9/2013 | Foege | F01P 3/22 105/26.05 |
| 2003/0187553 | A1 * | 10/2003 | Dillen | F02D 41/083 701/19 |
| 2004/0133315 | A1 * | 7/2004 | Kumar | B61L 27/0027 700/302 |
| 2005/0106040 | A1 * | 5/2005 | Repple | F01P 5/10 417/313 |
| 2005/0109882 | A1 * | 5/2005 | Armbruster | B61L 3/006 246/167 R |
| 2006/0021588 | A1 * | 2/2006 | Marsh | B60K 11/02 123/41.08 |
| 2007/0261648 | A1 * | 11/2007 | Reckels | F01P 7/167 123/41.12 |
| 2008/0103635 | A1 * | 5/2008 | Vuk | B60H 1/00828 700/300 |
| 2008/0125924 | A1 * | 5/2008 | Daum | B61L 3/006 701/19 |
| 2008/0202376 | A1 * | 8/2008 | Meltser | B61O 5/02 105/26.05 |
| 2009/0277429 | A1 | 11/2009 | Marsh et al. | |

* cited by examiner

METHOD FOR OPERATING A RAIL VEHICLE

BACKGROUND OF THE INVENTION

Field of the Invention

The invention relates to a method for operating a rail vehicle, which has a diesel engine, an engine radiator and a cooling circuit that connects the diesel engine to the engine radiator, a cooling liquid being circulated in the cooling circuit.

Increasingly higher demands with respect to environmental compatibility are being placed on diesel electric rail vehicles, in particular diesel locomotives. As with road traffic, here above all waste-gas emissions are to the fore. This presents the manufacturers of diesel engines with ever greater challenges. The observance of mandatory exhaust gas limits is achieved, for example, with the aid of exhaust gas recirculation, but this results in significantly higher quantities of heat in the diesel engine, which have to be transferred via the cooling water from the diesel engine to the engine radiator and discharged there. This also necessitates an increase in the size and weight of the engine radiator. However, both the radiator size, and above all, the radiator weight lead to ever greater drawbacks and problems.

In principle, larger quantities of heat from the diesel engine can only be discharged by correspondingly larger and more efficient engine radiators. Apart from the heat to be discharged, the decisive factor for the radiator dimensions is also the respective ambient temperature. In mathematical terms, the following relationship can be established:

$$\dot{Q} = c \dot{m} \Delta T$$

wherein $\dot{Q}$ is equal to the heat to be discharged per unit of time, i.e. ultimately the heat to be emitted from the radiator into the environment, c is the specific heat capacity of the ambient air, $\dot{m}$ is the throughput of air mass through the radiator per time unit and $\Delta T$ is the temperature difference between the air temperature at the inlet and at the outlet of the engine radiator. The air temperature at the inlet of the engine radiator is the same as the ambient temperature. The air temperature at the outlet of the radiator is heavily dependent upon the temperature of the cooling liquid of the diesel engine system. As mentioned above, $\dot{Q}$ is increasing steadily due to ever stricter regulations. The specific heat capacity c is a physical constant. Hence only the variables $\dot{m}$ and $\Delta T$ are able to compensate an increasing heat output to be discharged. However, an increase in $\dot{m}$ means larger radiators and larger fans. Therefore, in the end, this mathematical expression only defines a larger cooling system. $\Delta T$ is determined by the cooling water temperature of the diesel cooler system and the ambient temperature. The higher the cooling water temperature of the system is selected, the higher $\Delta T$ becomes, wherein the manufacturers of diesel engines set limits in this respect. The higher the ambient temperature, therefore, the smaller $\Delta T$ becomes. Obviously, it is not possible to influence the ambient temperature. However, when designing the diesel electric locomotive, it is necessary to define the ambient temperature up to which the full diesel engine power is available.

Due to the ever lower exhaust gas limits, the problem is increasingly encountered that, with a diesel electric locomotive, the cooling system is no longer able to discharge the quantities of heat produced by the diesel engine. In this case, to solve this problem, an automatic reduction of the diesel engine power dependent on the outer temperature and on the cooling water temperature is initiated. This could, for example on a hot day with outside temperatures of up to 35° C., result in the diesel electric locomotive no longer being able to travel at full diesel engine power, since the cooling system is only able to discharge the quantities of heat that occur at full load with outside temperatures of up to 32° C. However, reductions in the diesel engine power of this kind that are dependent upon the outer air temperature are restricted by the fact that it is necessary to adhere to the established timetables for a rail traffic network.

BRIEF SUMMARY OF THE INVENTION

It is therefore the object of the invention to provide a method of the type mentioned in the introduction with which even at high outer air temperatures diesel electric rail vehicles can be operated for as long as possible even at full load.

The invention achieves this object by a method for operating a rail vehicle, which has a diesel engine, an engine radiator and a cooling circuit that connects the diesel engine to the engine radiator, a cooling liquid being circulated in the cooling circuit, wherein a cooling liquid temperature of the circulated cooling liquid and an outer air temperature of the atmospheric outer air are detected, the outer air temperature is compared with a previously defined outer air limit temperature, the cooling power of the engine radiator is set in such a way that the cooling liquid temperature corresponds as closely as possible to a normal operating temperature if the outer air temperature is less than the outer air limit temperature, and the cooling power of the engine radiator is set in such a way that the cooling liquid temperature corresponds as closely as possible to a lower operating temperature, which is lower than the normal operating temperature if the outer air temperature is greater than the outer air limit temperature.

The invention is based on the regulation of the cooling liquid temperature of the cooling circuit. This takes into account the interaction between the diesel engine and the engine radiator. According to the invention, the cooling liquid of the cooling circuit circulated between the diesel engine and the engine radiator is adjusted by the regulation of the cooling circuit such that it is cooled to below the temperature prevailing during normal operation. The method according to the invention is only initiated if the outer air temperature has become so high that the engine radiator is no longer able to discharge the heat generated by the diesel engine if the diesel engine is running at full load. This occurs from temperatures that are equal to or greater than a previously known outer air limit temperature. If it is determined during the continuous temperature comparison that the outer air temperature rises above the outer air limit temperature, the cooling liquid and hence the entire cooling circuit is cooled to a lower temperature. Here, this lower temperature is designated the lower operating temperature. The lower operating temperature is obviously less than or lower than the normal operating temperature, that is the temperature of the cooling liquid, which, apart from initial over-regulation and under-regulation, prevails in the introduced or adopted condition of the system in the cooling liquid. In other words, according to the invention, cooling liquid is cooled down. After a certain time, the motor block and radiators of the entire cooling system will also achieve the lower operating temperature. If the rail vehicle now correctly accelerates the train at full load, due to the high outer temperature, the cooling power is not sufficient to discharge the waste heat from the diesel engine completely.

Therefore, the temperature of the cooling liquid rises above the lower operating temperature. An electronic regulator recognizes that lower operating temperature has been exceeded and takes full control of the engine radiator, for example a fan of the engine radiator. Due to the high heat to be discharged, however, the cooling liquid, motor block and radiators nevertheless become increasingly hotter. When an upper switch-off temperature is achieved, the diesel engine power is finally reduced. According to the invention, however, the diesel engine can be operated for longer at full load because the cooling liquid, the motor block and the radiators, that is the entire cooling circuit, with the excess heat only had to be brought to the switch-off temperature. During the heating phase of the cooling liquid from the lower operating temperature up to said switch-off temperature, the diesel engine could run at full load. In the ideal case, the rail vehicle reaches its final speed before the switch-off temperature is reached. This means that the train is accelerated at full load until the final speed even though the cooling system is not designed for the quantities of heat to be discharged. During the subsequent constant-speed travel of the train at partial load and with a lower amount of heat to be discharged, the engine radiator is controlled such that the temperature of the cooling liquid in the cooling circuit returns to the lower operating temperature. According to the invention, the next full-load period can hence be buffered to a certain degree with respect to the amount of heat to be discharged.

The above method steps are expediently integrated in a control algorithm for the vehicle regulation including the motor control and the radiator control.

Expediently, it is determined according to the invention whether the diesel engine is operated at full load or partial load. In an expedient embodiment, the method according to the invention is only initiated at partial load.

Expediently, the power consumption of selected electrical consumers of the rail vehicle is reduced if the outer air temperature exceeds the outer air limit temperature and the train accelerates at full load. The diesel engine provides the power supply for the entire train. Therefore, the power consumption of additional components reduces the amount of power available for the traction of the train. As already described in detail above, particularly at high ambient air temperatures, the difficulty occurs that the quantity of heat to be discharged from the diesel engine at full load can no longer be discharged quickly enough. At such high temperatures, there is also an increase in the power consumption of the so-called auxiliaries particularly due to the air conditioning for the train required at high temperatures. Hence, the transient disconnection of the air-conditioning system as an electrical consumer during the acceleration of the train enables the power consumption of the selected electronic consumers to be reduced so that the tractive power increases. Therefore, the rail vehicle reaches the desired speed more quickly resulting in shorter full-load periods.

Expediently, the reduction of the power consumption is achieved by the disconnection of said electronic consumers over a switch-off period. In other words, for example at high temperatures, the air-conditioning system is switched back on again after the expiry of the switch-off period. The switch-off period is expediently so short the passengers of the rail vehicle do not experience any loss of comfort.

Expediently, a load of the diesel engine is determined by obtaining a maximum load, wherein the duration of the maximum load of the diesel engine is selected as the switch-off period. In other words, for example during an acceleration of the rail vehicle during which the diesel engine is operated at full load, the air-conditioning system and/or another electrical consumer is shut down. Then, following a short interruption to or reduction in the power of air conditioning supply, normal operation is resumed.

Expediently, the vehicle position of the rail vehicle is detected while travelling on a stretch of rail, wherein the switch-off is performed taking into account said vehicle position as when taking into account of rail data from which ascents and descents of the stretch of rail can be derived. According to this advantageous further development, it is possible, for example, to calculate the period for which the rail vehicle travels at full load. It is also possible to take account of the period up to which a switch-off, for example of the air-conditioning system, is possible without the passengers experiencing any loss of comfort. In this case, the switch-off period is selected such that there is no loss of comfort. If further travel at full load is no longer possible, the acceleration of the rail vehicle is correspondingly reduced.

Expediently, the journey of the rail vehicle is specified in a timetable, wherein deviations from said timetable are determined via communication lines and the switch-off of consumers is performed taking into account the detected deviations.

According to a further expedient embodiment of the invention, the internal temperature in the interior of the rail vehicle and/or in the interior space of at least one carriage of the rail vehicle is detected, wherein the switch-off is performed as a function of the detected internal temperature.

According to the invention, a flexible construct is to be provided with which the switch-off of electrical consumers can be performed while retaining passenger comfort.

The above-described method and the steps of the method enable a rail vehicle to be operated at full load temporarily, including on hot days, even if the capacity of its cooling system is exceeded. To this end, there is no need to make fundamental changes to the components of the rail vehicles. Timetables can be adhered to as a result of brief periods travelling at full load despite the high outside temperatures. In addition, the invention can result in advantages if, for example, it is necessary to make up for delays. The measures according to the invention are expediently only initiated if they are necessary to this end. This means that there will only be an intervention in the normal operation of the rail vehicle if the outer air temperature exceeds an outer air limit temperature. The same applies in the opposite case, namely that the measures according to the invention are employed if the outer air temperature falls below the outer air limit temperature. The rail vehicle then continues to travel in normal operation. The same applies to the transient switch-off of the power supply to electrical consumers. In addition, further train information can be included in the decision as to whether selected electrical consumers are to be switched off. If the train is travelling according to schedule it is not absolutely necessary to initiate measures. However, if on a hot day, the train is delayed at numerous stops, these delays can be reduced by means of the measures described in the invention.

Further expedient embodiments and advantages of the invention are the subject matter of the following description of exemplary embodiments of the invention with reference to the figures of the drawing in which the same reference symbols refer to components having the same function.

BRIEF DESCRIPTION OF THE SEVERAL
VIEWS OF THE DRAWING

Figure 2:
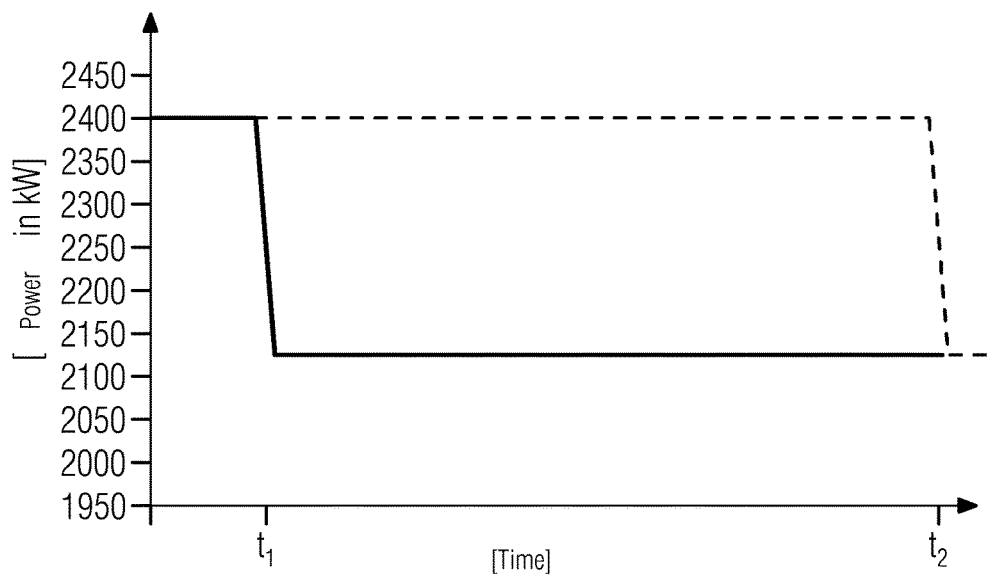
Figure 3:
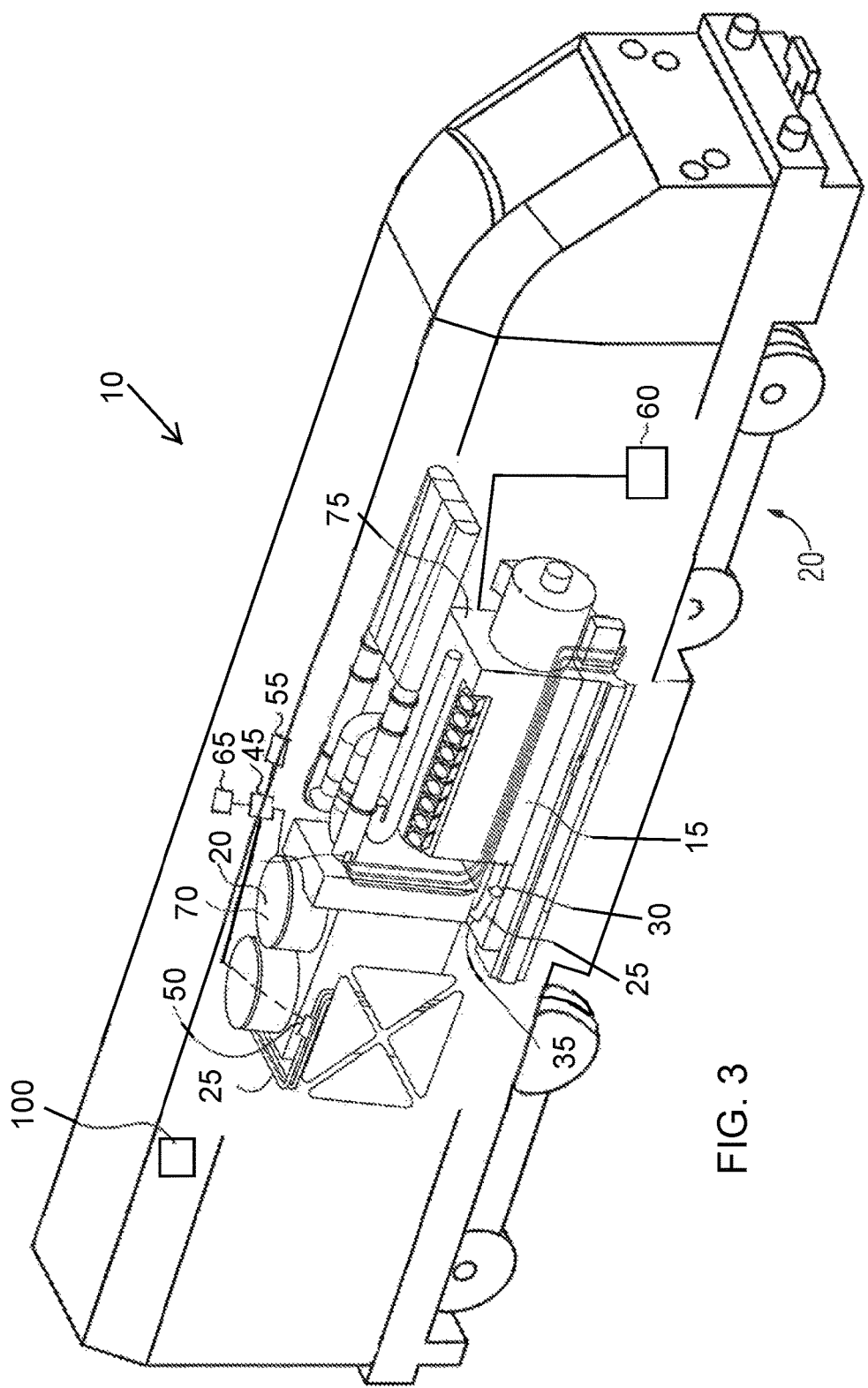
Figure 4:
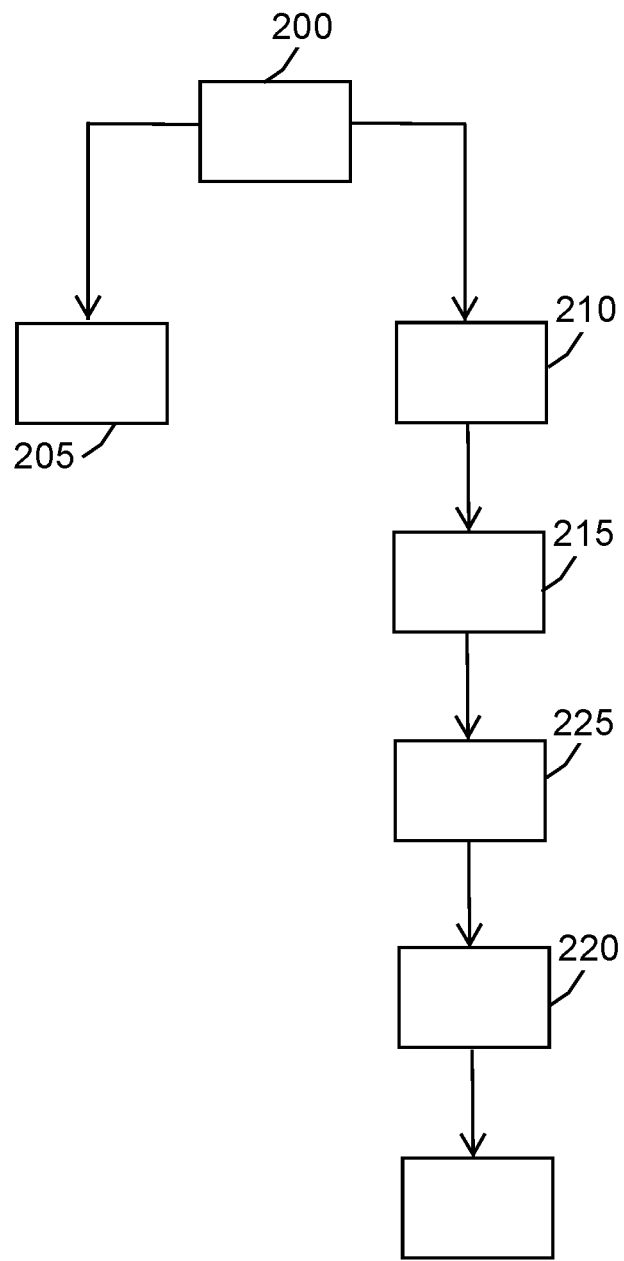

Fig. 1 shows a diagram schematically indicating the temperature of the cooling water once with and once without radiator precooling as a function of time and FIG. 2 the power of the diesel engine as a function of time for different methods, FIG. 3 shows a perspective view on a rail vehicle, FIG. 4 shows a flow chart of a method for operating the rail vehicle.

DESCRIPTION OF THE INVENTION

As already explained, the invention is based on the precooling of the cooling circuit of a diesel engine 15. An exemplary embodiment of the method according to the invention is used below with a rail vehicle 10 having a diesel engine 15 and an engine radiator 20. The diesel engine 15 and the engine radiator 20 are connected to each other via a cooling circuit 25. In the cooling circuit 25, a circulating pump 30 circulates a cooling liquid 35, in this case water. The process statuses of said system are shown in Table 1 below as a function of the coolant temperature.

| Coolant temperature in ° C. | Process status |
|---|---|
| −20 to 0 | Diesel engine at standstill - preheating |
| 0 to +20 | Diesel engine start - diesel engine operation only possible at idling |
| +20 to +60 | Diesel engine can be operated at partial load |
| +60 | Diesel engine can be operated at full load |
| +75 | Start of thermostat opening (thermostat mechanically regulates cooling water feed to radiator) |
| +85 | Fan - start of precontrol according to special curve |
| +88 | Thermostat fully open (thermostat mechanically regulates cooling water feed to radiator) |
| +93 | Cooling water operating temperature (reference point for electronic regulator) |
| +97 | Yellow alarm - reduction of diesel engine power |
| +99 | Red alarm - emergency diesel engine shutdown |

The above table should be treated as an example. Other diesel engines 15 and other cooling circuits 25 could have other limit temperatures. During normal travel, the cooling liquid 35 is kept at a specific normal operating temperature. To this end, a radiator regulator 45 is used. The radiator regulator 45 is connected to a cooling liquid sensor 50, which detects the temperature of the cooling liquid 35. The radiator regulator 45 is also connected to a temperature sensor 55 to detect the outer air temperature (step 200).

In the exemplary cooling circuit shown in Table 1, the normal operating temperature is 93° C. In other words, the cooling power of the engine radiator 20 is regulated by a radiator regulator 45 such that a cooling water temperature of 93° C. is established (step 205). If the heat output to be discharged is greater than the heat output that the engine radiator 20 is able to discharge, an upper switch-off temperature of 97° C. is quickly reached and a yellow alarm warning issued. If the vehicle control 60 receives a yellow alarm warning, it reduces the diesel engine power such that no overheating can take place. Apart from uphill driving, the driving profile of diesel locomotives is characterized in that a train is brought up to speed in a relatively short time at full load and then held at speed at partial load only. As is evident from the above table, the diesel engine can be operated at full load at 60° C. This means that at this temperature, the diesel engine is fully operational.

If the outer air temperature exceeds a prespecified outer air limit temperature from which the engine radiator 20 is no longer able to discharge heat from the diesel engine 15 generated at full load, the method according to the invention is initiated.

In the exemplary embodiment shown, therefore, at partial load, the temperature of the cooling liquid circulating in the cooling circuit is kept at 60° C. (step 210). After some time, not only the cooling liquid, but also the entire motor block, the radiators 20 and other components of the cooling circuit 25 reach this temperature. Therefore, the entire cooling circuit functions like a cold store. If the rail vehicle is accelerated, the diesel engine travels at full load (step 215). Due to the high outer temperature, the cooling power of the engine cooling circuit 25 is no longer sufficient to discharge the waste heat from the diesel engine 15. This causes the cooling liquid temperature to rise above the lower operating temperature (step 220). An electronic regulator 65 recognizes that the lower operating temperature has been exceeded and takes over full control of the cooling fans 70 of the engine radiator 20 (step 225). Due to the high heat to be discharged, the cooling liquid 35, the motor block 75 and the radiators 20, that is the entire cooling circuit 25, become increasing hotter. Only when the switch-off temperature is reached is the diesel engine power reduced (step 230). However, according to the invention, the diesel engine 15 could be operated for longer at full load because the cooling liquid, the motor block and the other components of the engine cooling only have to be brought to the switch-off temperature, in this case 97° C., in the case of excess heat. During this period, the diesel engine could run at full load. the internal temperature in the interior of the rail vehicle and/or in the interior space of at least one carriage of the rail vehicle is detected by a temperature sensor 100, wherein the switch-off is performed as a function of the detected internal temperature.

This is illustrated in FIG. 1. The continuous line shows behavior during normal operation without the method according to the invention. It can be identified that, in normal operation, the temperature of the cooling circuit 25 is initially 93° C. In addition, it is assumed that the outer air temperature is greater than the outer air limit temperature. In this case, the rail vehicle 10 travels continually at full load. The heat of the diesel engine 15 can then no longer be discharged by the engine radiator 20. Relatively quickly, at time t1, the 97° C. switch-off temperatures are reached at which there is a yellow alarm and hence a reduction in the diesel engine power. The dashed line shows the temperature of the cooling liquid when incorporating an exemplary embodiment of the method according to the invention. It may be identified that the temperature of the cooling liquid has been brought to 60° C. as the lower operating temperature. Only gradually, is there an increase in the temperature of the cooling liquid 35 so that a substantially longer time has passed until the cooling water 35 reaches 97° C. at time t2. In an ideal case, the acceleration is completed before 97° C. is reached so that the engine cooling capacity is again sufficient to cool the temperature of the cooling liquid back down to 60° C.

FIG. 2 shows the corresponding control of the diesel engine 15—once without the method according to the invention with the aid of the continuous line and once the control with the aid of the method according to the invention by means of the dashed line. It can be identified that, in the case of a normal control method without the invention, the power of the diesel engine at full load has to be reduced from 2400 MW to 2125 MW as early as time t1. According to the invention, the reduction is only necessary at time t2.

FIG. 2 shows the corresponding control of the diesel engine—once without the method according to the invention with the aid of the continuous line and once the control with the aid of the method according to the invention by means of the dashed line. It can be identified that, in the case of a normal control method without the invention, the power of the diesel engine at full load has to be reduced from 2400 MW to 2125 MW as early as time t1. According to the invention, the reduction is only necessary at time t2.

The time gap between t1 and t2 is the time for which the diesel engine can be operated for longer at full load.

The method according to the invention can be easily integrated into already existing rail vehicles. The method according to the invention is hence very inexpensive.

The invention claimed is:

1. A method for operating a rail vehicle having a diesel engine, an engine radiator and a cooling circuit connecting the diesel engine to the engine radiator, a cooling liquid being circulated in the cooling circuit, an electronic regulator for controlling the diesel engine, a cooling liquid temperature sensor, an outer air temperature sensor and an electronically controlled engine radiator fan, which comprises the steps of:

detecting a cooling liquid temperature of the cooling liquid and an outer air temperature of an atmospheric outer air;

comparing the outer air temperature with a previously defined outer air limit temperature;

when the outer air temperature is less than the outer air limit temperature:

regulating the cooling circuit for corresponding the cooling liquid temperature to a normal operating temperature;

when the outer air temperature is greater than the outer air limit temperature the following steps are performed:

travelling the diesel engine on partial load and regulating the cooling circuit so that the cooling liquid temperature corresponds to a lower operating temperature being lower than the normal operating temperature, the lower operating temperature corresponds to a lowest temperature at which the diesel engine can operate on full power;

after travelling the diesel engine on partial load, travelling the diesel engine on full load and accelerating the rail vehicle to a final speed for raising the cooling liquid temperature on full load of the diesel engine from the lower operating temperature; and reaching the final speed with a cooling liquid temperature which is lower than a switch-off temperature of the diesel engine.

2. The method according to claim 1, which further comprises reducing a power consumption of an air conditioning system of the rail vehicle when the outer air temperature exceeds the outer air limit temperature.

3. The method according to claim 2, wherein a reduction of the power consumption takes place by a complete switch-off of the air conditioning system over a switch-off period.

4. The method according to claim 3, which further comprises basing the switch-off period on an amount of time the diesel engine operates on full load;

detecting the full load of the diesel engine and an amount of time the diesel engine the diesel engine operates under full load.

5. The method according to claim 3, which further comprises:

detecting a vehicle position of the rail vehicle when travelling on a stretch of rail;

derivating ascents and descents of a stretch of rail; and performing a switch-off on a basis of the rail data the position of the rail vehicle.

6. The method according to claim 3, which further comprises:

determining deviations from a timetable; and performing the switch-off taking into account deviations detected.

7. The method according to claim 3, which further comprises providing an internal temperature sensor, detecting at least one of an internal temperature in an interior of the rail vehicle or in an interior space of at least one carriage of the rail vehicle, wherein the switch-off is performed in dependence on a detected internal temperature.

8. The method according to claim 1, wherein a first value of a first difference between the normal operating temperature and the lower operating temperature is higher than a second value of a second difference between the normal operating temperature and the switch-off temperature.

9. The method according to claim 1, wherein the lower operating temperature is 60° C.

* * * * *